S. W. CROSS.

Improvement in Machines for Making Chair-Seats.

No. 132,447. Patented Oct. 22, 1872.

UNITED STATES PATENT OFFICE.

SAMUEL W. CROSS, OF WAUPUN, WISCONSIN, ASSIGNOR TO HIMSELF AND GEORGE F. WHEELER, OF SAME PLACE.

IMPROVEMENT IN MACHINES FOR MAKING CHAIR-SEATS.

Specification forming part of Letters Patent No. 132,447, dated October 22, 1872.

*To all whom it may concern:*

Be it known that I, SAMUEL W. CROSS, of Waupun, in the county of Fond du Lac and State of Wisconsin, have invented certain Improvements in Machines for Making Chairs, of which the following is a specification:

This invention is more especially designed for shaping the seats or bottoms of rocking-chairs; and it consists in a pivoted carriage traversing a semicircular undulating track, in combination with a suitably-arranged rotary cutter, and also with a cutting-cylinder, whereby the operations, respectively, of approximately shaping and of finishing the seat-surfaces of the chair-bottoms may be performed. The invention also consists in the combination of a holding-lever with the carriage traversing the track, and arranged with reference to the cutter and cylinder in such wise that the block from which the seat is formed may be firmly held while subjected to the action of the machine, and also enabled to be easily placed in and removed from the apparatus.

Figure 1:
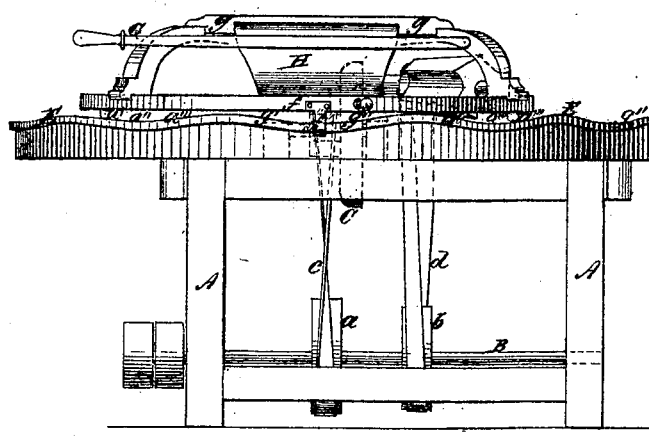
Figure 2:
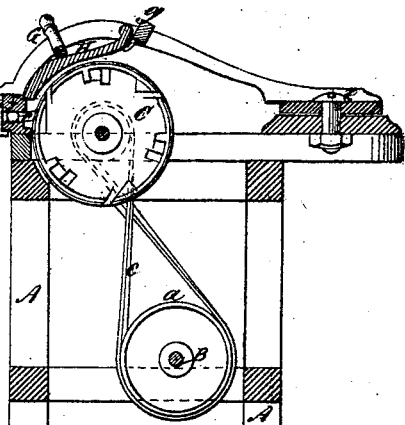
Figure 3:
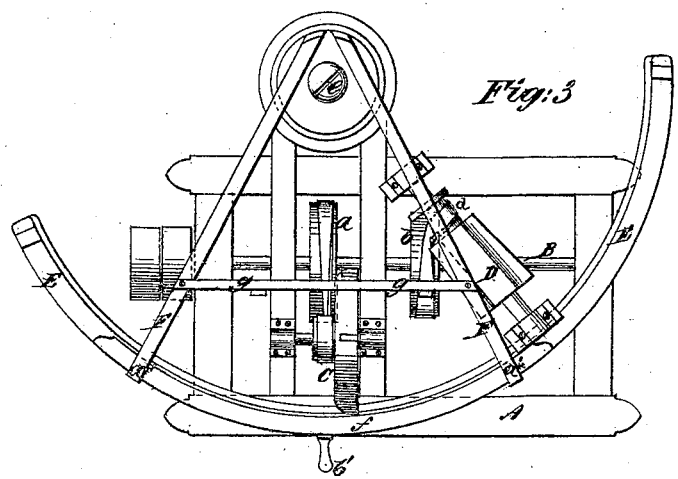

Figure 1 is a front view of a machine constructed according to my invention. Fig. 2 is a vertical transverse section of the same taken in a plane at right angles to Fig. 1. Fig. 3 is a plan view of the same.

A is the supporting-frame of the machine, carrying at its lower part the shaft B; this latter is furnished with pulleys $a$ $b$, from which run belts $c$ $d$, the former, $c$, to a pulley on the shaft of a rotary cutter, C, the latter, $d$, to a pulley on the shaft of a cylindrical cutter, D. The cutter C is constructed to cut the seat-surface of the chair-bottom approximately to the requisite shape, when the block from which such bottom is made is properly passed over or in contact with it. The cylinder D is in a similar manner provided with knives for finishing the forward portion of the surface after the same has been approximately brought into form by the cutter C. Provided upon the frame A, in appropriate relation to the cutter C and cylindrical cutter D, is a curvilinear track or way, E, formed on the arc of a circle concentric with the bolt or pivot $e$, to which pivot is attached the carriage F, the outer side or arc portion $a'$ of which rests upon the track E, with which it is concentric. The attachment of the carriage to the pivot $e$ is sufficiently loose to permit a slight vertical movement of the outer or front portion of the frame F in following the undulations or inclines formed upon the upper or bearing-surface of the track, as shown in Fig. 1, and which are so provided as to raise or lower the block from which the seat is formed as required in giving the hollow contour required in the transverse section of the seat. Projecting from the front bar $f$ of the carriage is a handle, $b'$, by which the same may be readily moved upon the track. A hook or catch, $f''$, on the bar $f'$ laps under a flange on the front edge of the track to prevent the lifting of the carriage therefrom. Provided at one side of the carriage is a transverse lever, G, and rigidly provided in the same is a cross-bar, $g$.

The block H, to be shaped into a chair-bottom, is placed with its rear edge resting against the cross-bar $g$, and its forward edge upon the front bar $f$, as more clearly shown in Fig. 2. The lever G is then brought down upon the block, as represented in Fig. 1, and firmly held upon it while the carriage is made to traverse from one end to the other of the track, as from left to right. This movement of the carriage first brings the block in contact with the rotary cutter C, which cuts away the superfluous material. At the moment the required portion of the block comes in contact with the cutter the ends $a'$ of the frame move down and up the inclines $a''$ $a'''$, the downward or scooping movement thus given to the block allowing the cutter C to form the hollow in transverse section, required in the well-shaped seat-surface of a chair-bottom. After the block has passed from the cutter C the continued movement of the carriage brings it in contact with the cylinder D, by which the surface is finished or completed in contour, the block receiving an undulatory movement when passing over the cylinder, answering to that communicated thereto while subjected to the action of the cutter C, and for a like purpose, by means of inclines $g'$ $g''$ upon the track, corresponding to the others $a''$ $a'''$, previously herein described. The cutter C hollowing out the concave rear part of the seat-surface, the comparatively flat forward portion of the latter is smoothed off by the cylindrical cutter D, which, from its different position as compared with the cutter C, acts upon the wood at a different angle to its grain.

What I claim as my invention is—

1. The combination of the pivoted carriage F, traversing the undulating track E, concentric with the pivot e, with the rotary cutter C, substantially as herein set forth, for the purpose specified.

2. The combination of the pivoted carriage F, traversing the undulating track E concentric with the pivot e, with the finishing-cylinder D, substantially as herein set forth, for the purpose specified.

SAML. W. CROSS.

Witnesses:
J. W. WHITNEY,
J. LEVY.